A. H. GFRÖRER.
BAGGAGE TRUCK.
APPLICATION FILED SEPT. 29, 1914.
1,242,677.
Patented Oct. 9, 1917.
2 SHEETS—SHEET 1.
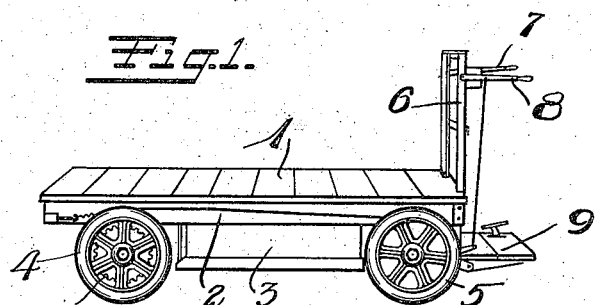
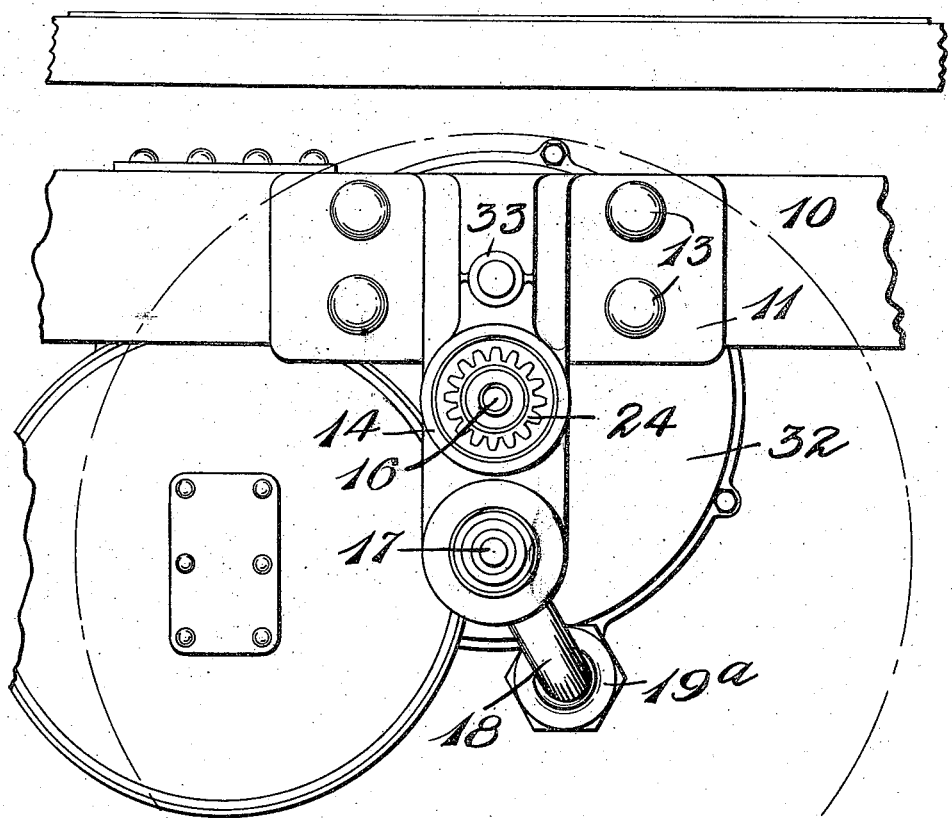

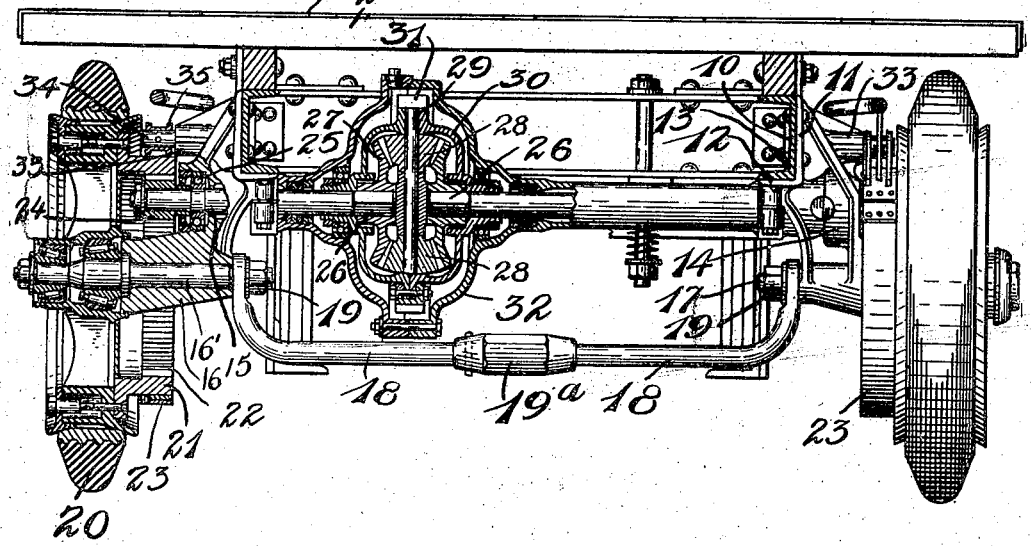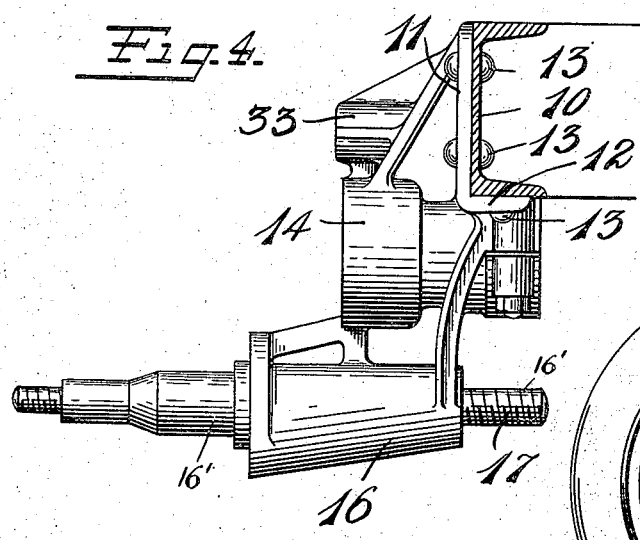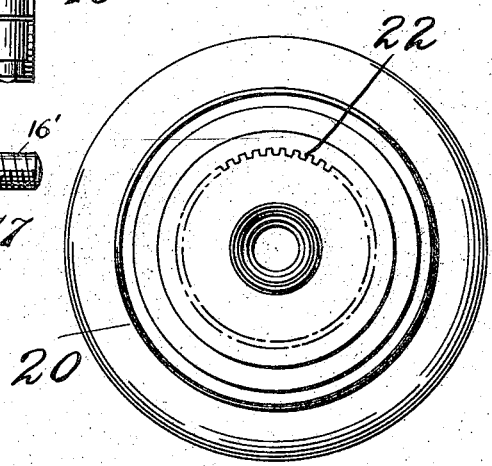

UNITED STATES PATENT OFFICE.

ALBERT H. GFRÖRER, OF WEST NEW BRIGHTON, NEW YORK, ASSIGNOR TO C. W. HUNT COMPANY, INC., OF WEST NEW BRIGHTON, NEW YORK, A CORPORATION OF NEW YORK.

BAGGAGE-TRUCK.

1,242,677. Specification of Letters Patent. Patented Oct. 9, 1917.

Application filed September 29, 1914. Serial No. 864,107.

*To all whom it may concern:*

Be it known that I, ALBERT H. GFRÖRER, a citizen of the United States, and resident of West New Brighton, in the county of Richmond and State of New York, have invented a new and useful Improvement in Baggage-Trucks; and I do hereby declare the following to be a full, clear, and exact description thereof.

My invention relates to improvements in baggage truck construction, although it is to be understood that some features of the invention may be applied to motor trucks for other purposes and to load carrying trucks of greater or less size. The invention relates particularly, though not exclusively, to the manner of connecting up the driving motor with the running gear of the truck. The invention also relates to the general construction and arrangement of the operating parts of the truck.

With these objects in view the invention consists in a construction and arrangement of parts, a preferred embodiment of which is illustrated in the accompanying drawings, in which Figure 1 is a perspective view of the truck as a whole; Fig. 2 is a side elevation of details of the driving mechanism with the wheel of the truck removed for clearer illustration. Fig. 3 is a sectional view through one of the running gear wheels and longitudinally of the axis thereof and also longitudinally of the driving shaft and the connections thereof to the running gear, and Fig. 4 is a detailed elevation of a form of bracket in which the wheel axle and the driving shaft therefor are mounted. Fig. 5 is a side elevation of one wheel.

Referring to Fig. 1, 1 indicates the truck body having a steel or other strong metal framework 2; 3 indicates the usual battery case, 4 the driving wheel of the running gear, 5 the guiding wheels thereof and 6 is an upright framework at the driver's end of the truck upon which are mounted a starting lever 7 and a brake lever 8. 9 is the operator's platform.

Referring to Fig. 4, 10 indicates in section one of the side bars of the truck frame. To this frame is riveted or otherwise secured a bracket for receiving and forming a journal for the axle of the running gear wheel and the shaft of the driving mechanism. This bracket comprises a face plate 11, having an angle portion 12, which underlies the lower edge of the side bar and these parts are riveted or bolted to the side bar as at 13, thereby very securely mounting this running gear bracket to the truck frame. The bracket has a downward extension provided with an integral bearing sleeve 14 for the reception and journaling of one of the sections 15 (Fig. 3), of the driving shaft. Below this bearing sleeve 14 and integral with the bracket is an axle supporting sleeve 16, within which the wheel axle 16' is fixedly mounted. The inner end of this axle is threaded as at 17 to receive the aperture end of one member of the strut and adjusting bar 18, which is held in place on the axle by a nut 19. The two members of this strut and adjusting member are connected by a turnbuckle 19$^a$, by which the bearing brackets on either side of the truck may be accurately alined or straightened out to cause true running of the truck. The running wheel indicated at 20 may be of usual construction and has secured to the inner side of the felly a ring 21 having a driving gear and brake face. This gear has internal teeth 22 and may be surrounded by a brake band 23 of usual form. Each section of the driving shaft 15 has mounted thereon a pinion 24, which meshes with the gear 21. The driving shaft sections may be mounted in ball bearings 25 of any suitable construction and the inner end of this section of the driving shaft is squared as at 26 to receive one of the gears 27 of the differential. Beveled gears 28 are mounted between the differential gears 27 on a pin 29, which in turn carries a rotatable frame 30, and on the outside of this frame is secured a gear 31, which meshes with the driving gear of the motor (not shown) in any desired manner. A housing 32 incloses and protects the differential from dust and dirt in the usual manner. The operative connections between the operating lever 7 and the motor may be of any desired construction.

Also in a sleeve or bearing 33 of the running gear bracket is mounted a stud or shaft 34 upon which the brake gear of any suitable construction is mounted.

It will be seen from the above construction that in one single rigid bracket are mounted not only the axle of the running gear 20, but also the driving shaft 15. Thus the relation in position between the gear 22 of the vehicle wheel and the driving pinion 24 on the driving shaft section 15 will remain constantly the same, notwithstanding severe shocks and jolts on the truck and unevenness of the surface over which it is run. Furthermore by connecting the running gear brackets on each side of the truck by means of the adjusting rod 18, both of these brackets may be simultaneously adjusted and positioned with respect to each other and with respect to the truck frame, so as to insure accurate running of the truck and to prevent grinding of the driving gears and connective parts.

While I have herein described a particular embodiment of my invention, it is to be understood that the same may be altered in construction and relative arrangement of parts within the scope of the appended claims.

What I claim is:

1. In a motor truck, the combination with the main truck frame of a rigid bracket secured thereto, said bracket comprising an axle support rigid therewith and a driving shaft support rigid therewith, whereby the wheel mounted on said axle will remain in constant position relative to said driving axle and to the truck frame.

2. In a motor truck, the combination with a main truck frame, a running gear bracket rigidly secured thereto, said bracket having an axle support rigid therewith and a journal for the driving shaft rigid therewith, a running wheel, an internally toothed gear wheel mounted on said wheel, a pinion on the end of said shaft meshed therewith, said rigid bracket forming a rigid support to maintain a constant relation or distance between said gear wheel and pinion and truck frame.

3. In a motor truck, the combination with the main truck frame, of a pair of rigid bearing brackets mounted upon opposite sides thereof, each bracket comprising an axle support rigid therewith and a driving shaft support rigid therewith, an adjusting rod connecting said brackets, whereby said brackets may be simultaneously adjusted with respect to each other and with respect to the truck frame to cause true running of the truck.

In testimony whereof, I the said ALBERT H. GFRÖRER have hereunto set my hand.

ALBERT H. GFRÖRER.

Witnesses:
FRANK H. PLUM,
HENRY D. TUCKER.